No. 747,354. PATENTED DEC. 22, 1903.
G. BAEHR.
ELECTRIC WELDING MACHINE.
APPLICATION FILED AUG. 6, 1902.
NO MODEL. 3 SHEETS—SHEET 1.
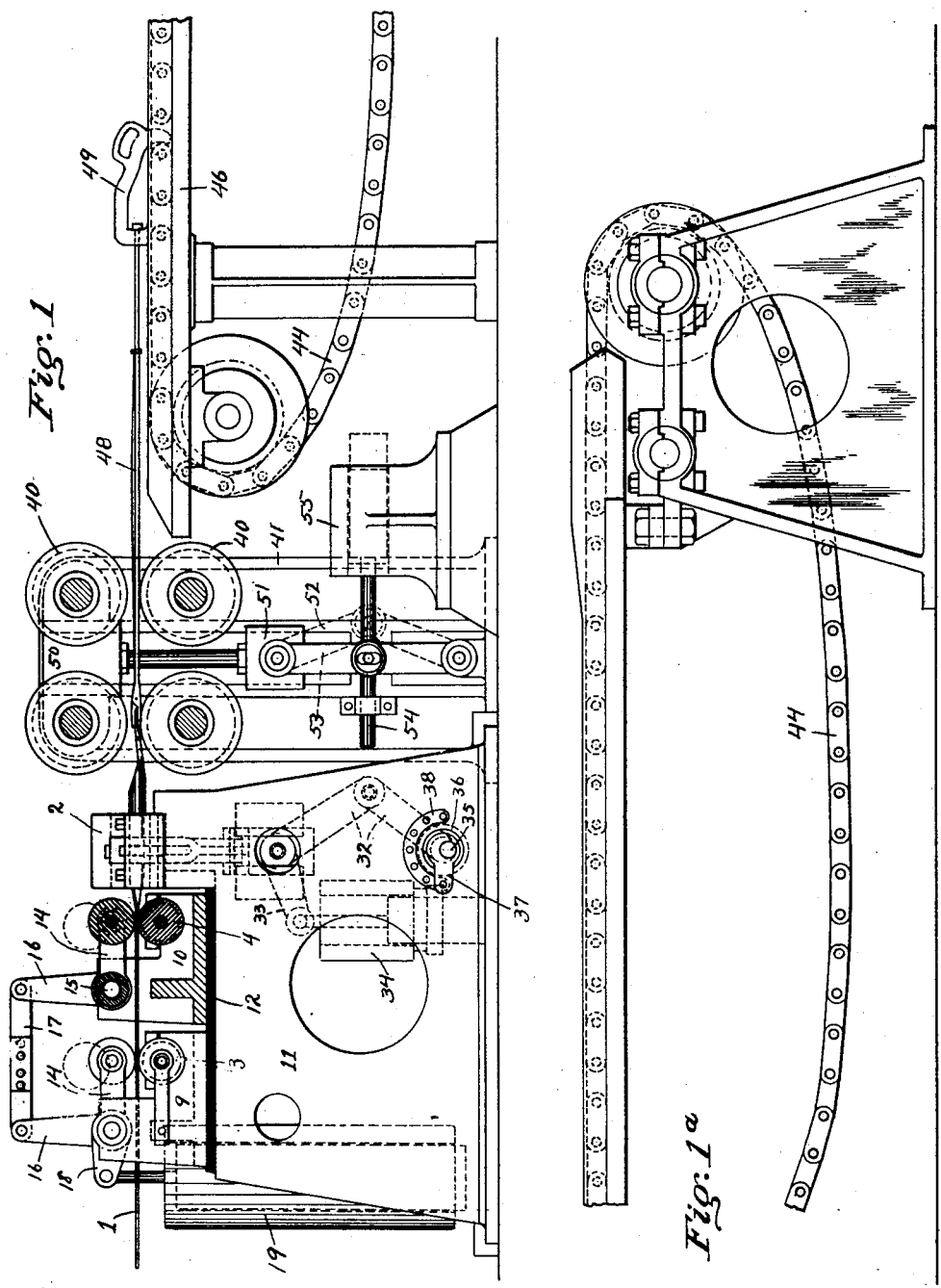
Witnesses
Inventor.
Attorneys

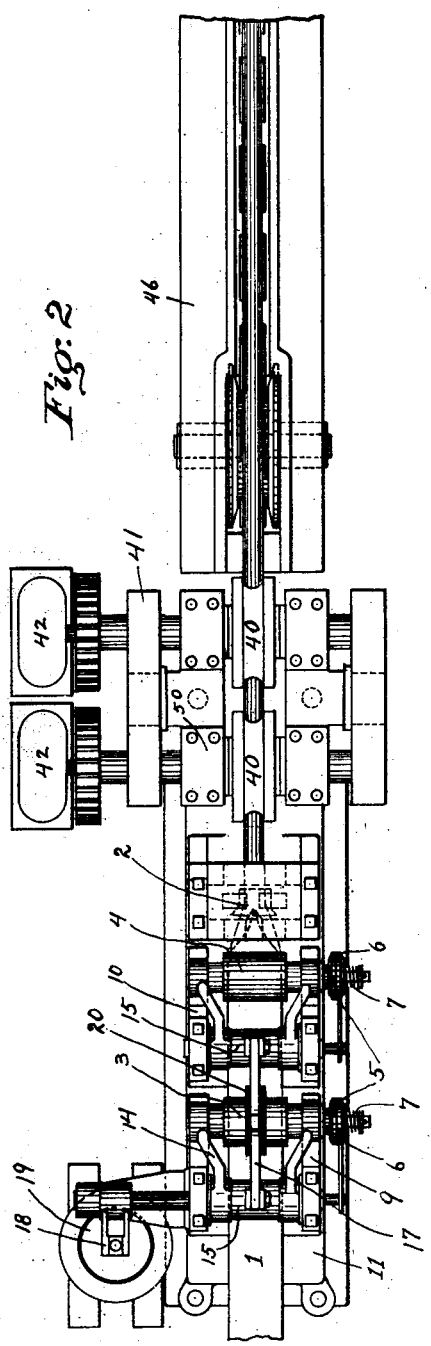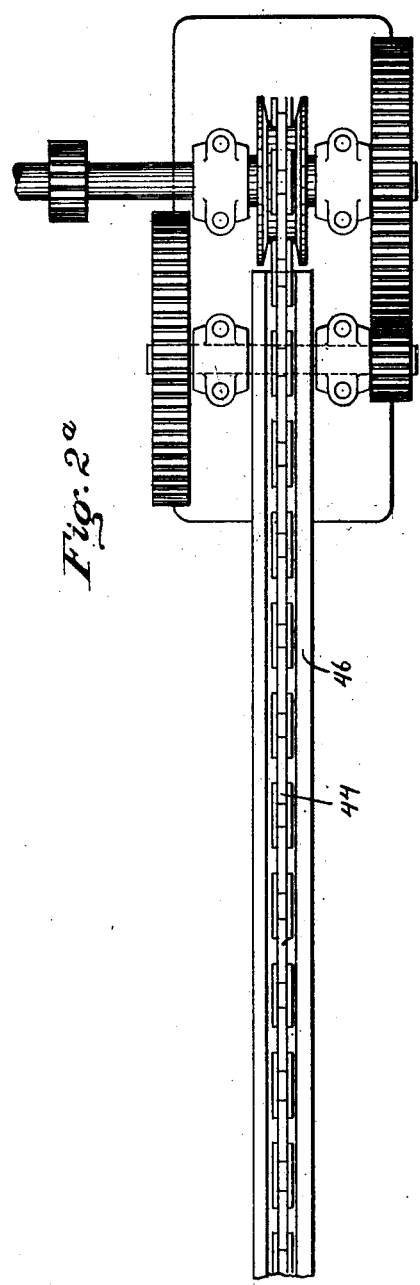

No. 747,354. PATENTED DEC. 22, 1903.
G. BAEHR.
ELECTRIC WELDING MACHINE.
APPLICATION FILED AUG. 6, 1902.
NO MODEL. 3 SHEETS—SHEET 3.
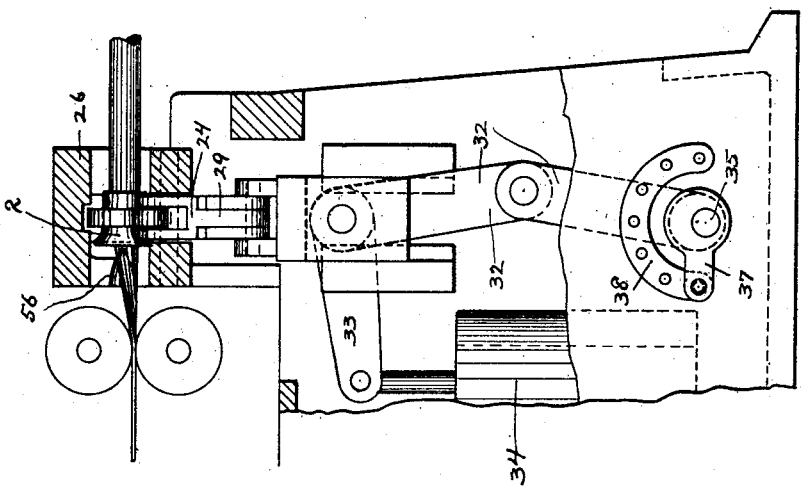
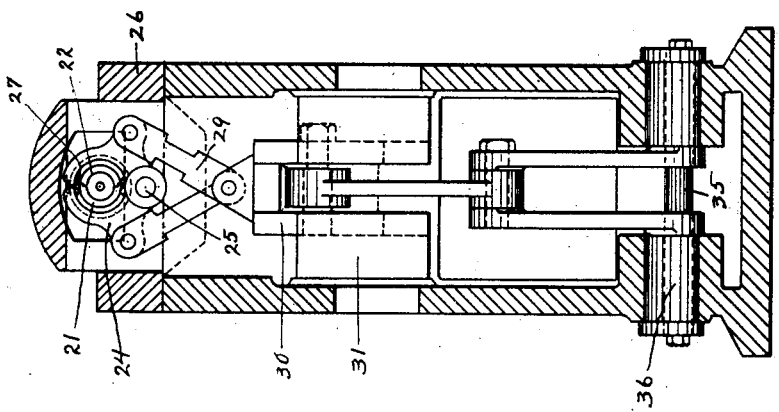
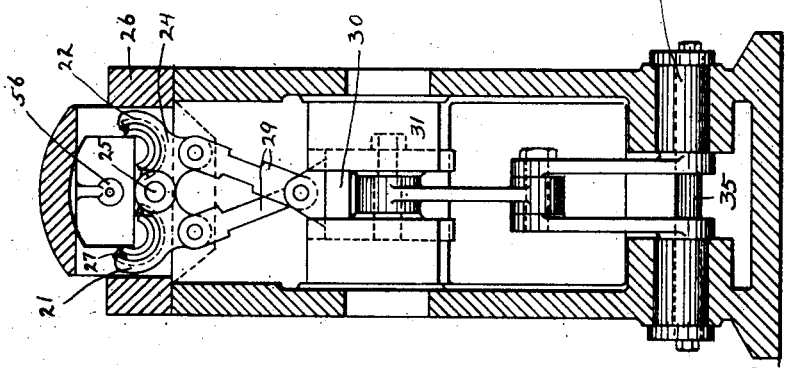
Witnesses. Inventor.

No. 747,354.

Patented December 22, 1903.

UNITED STATES PATENT OFFICE.

GEORGE BAEHR, OF McKEESPORT, PENNSYLVANIA, ASSIGNOR TO NATIONAL TUBE COMPANY, OF NEW YORK, N. Y., AND PITTSBURG AND McKEESPORT, PENNSYLVANIA, A CORPORATION OF NEW JERSEY.

ELECTRIC WELDING-MACHINE.

SPECIFICATION forming part of Letters Patent No. 747,354, dated December 22, 1903.

Application filed August 6, 1902. Serial No. 118,561. (No model.)

*To all whom it may concern:*

Be it known that I, GEORGE BAEHR, a resident of McKeesport, in the county of Allegheny and State of Pennsylvania, have invented a new and useful Improvement in Electric Welding-Machines; and I do hereby declare the following to be a full, clear, and exact description thereof.

My invention relates to apparatus for forming welded tubing; and its object is to provide apparatus whereby such tubing can be formed in almost indefinite lengths, and especially to provide apparatus which is to be placed in front of rolling-mill finishing-rolls, so that hot skelp can be fed directly to said apparatus.

In the manufacture of ordinary butt-weld and lap-weld tubing the lengths which can be formed are limited by the length of the furnaces, and the latter are limited in length, because it is impossible to uniformly heat a furnace of exceeding great length, and otherwise the tube-blanks will be unequally heated and result in defective tubing. In the formation of butt-weld tubing, furthermore, it is not possible to draw very great lengths without liability of stretching the part already welded. On account of these several causes the commercial length of welded tubing has been from eighteen to twenty (18 to 20) feet, and as portions of the tubing at both ends must be cut off, thus resulting in scrap, the loss is considerable, so that any means whereby the length of the tubing can be increased would result in a corresponding saving in scrap. It would also result in reducing the amount of labor—that is, it would require practically no more labor or manipulation to weld a very long blank into tubing than to weld the present short blanks.

The object of my invention is to overcome the foregoing drawbacks in the manufacture of welded tubing and to provide apparatus where almost an indefinite length of tubing, either butt-weld or lap-weld, may be formed.

To these ends my invention consists in means for continuously and progressively heating a tube-blank and continuously bending and welding the same into tubing. Preferably the heating will be done electrically, and a blank will be drawn or fed through the welding-die by means of rollers running in contact with the tubing, so that no great length of welded tubing will be interposed between the drawing mechanism and the welding-die, thus preventing stretching, and the rolls, furthermore, permit of the drawing through the welding-die of an indefinite length of tubing, not being limited in this particular as a draw-chain or other traveling drawing mechanism is limited.

In the accompanying drawings, Figures 1 and 1ª are a side view, partly in section, of my improved tube-welding apparatus. Figs. 2 and 2ª are a plan view of the same. Fig. 3 is a transverse section through the welding mechanism. Fig. 4 is a similar view showing the die-holder in its closed position, and Fig. 5 is a longitudinal vertical view through the welding mechanism.

The tube-blank is shown at 1 as a flat plate, and this may either be formed with scarfed edges to form lap-weld tubing or preferably will have square edges to form butt-weld tubing. Instead of a flat tube-blank, however, one bent into U or partially circular form may be employed. This tube-blank may be of any desired length and may come directly from the finishing-rolls of a skelp-mill. It will be fed continuously to the welding means 2, which in the present case is shown as a bell, and it will be heated continuously and progressively as it is fed forward. This heating may be accomplished in any desired way, but preferably will be done electrically. To this end I provide two pairs of contact-rollers 3 and 4. Both rollers of each pair may be connected in the circuit in any desired manner, but preferably only the lower ones of each set are so connected, and to this end contact-disks 5 are provided on the ends of the rollers, and bearing against these contact-disks are other contact-disks 6, which are connected to the mains in any suitable way (not shown) and which are held by means of the spring 7 against the contact-disks 5 on the rollers. The top rollers are electrically connected to the lower rollers in any suitable way. The set of rollers 3 are mounted in a frame 9, and the set of rollers 4 are mounted in a similar frame 10, both of these frames being mounted on the main frame 11 and insulated therefrom by the strip of insulation 12. The upper rollers of each pair are designed for holding the blank against the contact-rollers. They are so mounted as to be separable from the lower rollers in order to permit the insertion of a fresh blank. Various ways of so mounting them may be employed, and I have shown them journaled in the ends of arms 14, which are connected to rock-shafts 15, and these rock-shafts in turn are provided with upwardly-extending arms 16, connected by means of a link 17. One of the rock-shafts 15 is extended beyond the sides of the frame and provided with an arm 18, which is connected to suitable mechanism for rocking the shaft. Any mechanism for this purpose may be employed—as, for instance, a hand-lever, a hydraulic cylinder, or the like; but I prefer to connect the same to the core of a solenoid 19, so arranged that when said solenoid is energized the top rollers will be pressed against the tube-blank to hold the same against the bottom rollers. When the solenoid is deënergized, the weight of the solenoid-core will elevate the top rollers, as indicated in dotted lines, Fig. 1. One of the bottom rollers—as, for instance, the roller 3—will be connected to the plus pole of the dynamo, while the other one will be connected to the minus pole, thus causing the current to traverse the plate from the rollers 3 to the rollers 4, or vice versa, and as a current of large amperage and low voltage will be employed the plate will be quickly, uniformally, and progressively heated as it travels through said rollers. To prevent the current from short-circuiting through the top rollers and link 17, the latter is formed in sections, as shown, which are connected by means of strong fibrous strips or the like, 20, which will thoroughly insulate said link. Any other means of insulation, however, might be employed.

Just in front of the current-conducting rollers 4 is the welding means, which may be in the form of welding-rolls, but which preferably is in the form of a bell 2, through which the plate will be drawn, and thereby bent into tubular form, and its edges welded together. As the mechanism for drawing the blank through the bell must be located in advance of the same, the blank must first be advanced beyond the bell in order that it may be gripped, and for that reason the bell will be a separable one, formed of two parts 21 and 22, as shown in Fig. 4, which parts will be mounted in a separable bell-holder. This bell-holder comprises two similar jaws 24, oppositely arranged and pivoted on the pin 25, secured in the standard or frame 26. The jaws 24 are provided with projections or teats 27 for engaging grooves or notches in the sections of the bell in order to hold the latter in place. When the front end of a fresh plate is introduced into the machine, the bell-holder will be in the position shown in Fig. 3—that is, with the two sections of the bell held one in each jaw of said holder. The plate is heated by the current and fed forward until its ends project far beyond the welding-bell in order to be grasped by the pulling mechanism. The bell-holder will then be closed or brought to the position shown in Fig. 4, thereby bending the projecting end of the blank into tubular form. The bell-holder and bell are then maintained in this position and the blank is drawn therethrough, being thereby bent into tubular form and its edges welded together. When the end of another blank, however, is introduced, the bell-holder will again be opened, as described.

Any suitable mechanism may be employed for opening and closing the bell-holder, and I have shown for this purpose a pair of links 29, one of which is connected to each section of the bell-holder and having their lower ends pivoted to the block 30, which is mounted to move in vertical guideways 31 in the frame 26. This block is elevated and lowered by means of a pair of toggle-links 32, one of which has connected thereto the arm 33, which is connected to the core of a solenoid 34. Any other power mechanism for raising and lowering the block 30 might be employed. In order to limit the throw of the core of the solenoid 34, the toggle-links 32 are made adjustable, as by having the lower end of the lower one of said links mounted on a pin 35, the ends of which are surrounded by eccentric sleeves 36, provided with arms 37. The arms 37 are provided with pins, which may be inserted in any one of the holes indicated on the segment 38, thus giving any desired adjustment to the toggles and correspondingly regulating the throw of the solenoid 34.

Any suitable mechanism for drawing the blank through the heating-rolls and welding-bell may be employed; but in order to weld long lengths of tubing this drawing mechanism will preferably be in the form of rolls running in contact with the tubes. I have shown for this purpose grooved rolls 40. One pair of such rolls may, if desired, be employed; but in order to secure sufficient draft on the tube I preferably employ two pairs. These rolls are ordinary grooved rolls, such as used for sizing-rolls, and will serve the purpose not only of drawing the blank through the welding mechanism, but also sizing the same. They are mounted in suitable housings or frames 41 and may be driven in any desired manner—as, for instance, from the electric motors 42. I prefer to use two such electric motors, one for each pair of rolls, as in that way the forward pair of rolls may be driven at a slightly-higher speed than the rear pair.

While the rolls described effectively draw an indefinite length of tubing through the welding mechanism, it is necessary that the tubing in the first instance be formed of sufficient length to come within the grasp of the rolls. Some preliminary drawing mechanism will therefore be provided, and I have shown for this purpose a draw-chain 44, running over pulleys on an ordinary draw-bench 46 and driven by any suitable mechanism. A suitable gripper, such as the tongs 48, will be employed, this tongs grasping the forward end of the blank, as shown, and having its reins adapted to be connected to the draw-chain—as, for instance, by means of the hook 49. The tongs and draw-chain will serve to pull the blank forward until the forward end is entirely through the rollers 40, after which the latter will serve to draw the tube through the bell, although if very short lengths are being operated upon the tongs may draw the entire length of tubing through the bell. In order to permit the tongs to be attached to the end of the blank, as soon as the latter projects beyond the welding-die it is necessary to separate the rollers 40, and accordingly I have mounted the upper rollers in a frame 50, which is connected to a block 51, mounted in vertical ways 52 in the housings. This block may be raised and lowered by any suitable mechanism, such as the toggle-links 53, connected, by means of a rod 54, to the core of a solenoid 55. Various other means for raising the top rolls, however, may be employed.

In the use of my apparatus the tube-blank, which may come in a heated state from the finishing-rolls of a rolling-mill, is fed to the machine and its forward end inserted between the current-conducting rollers 3 and 4. The solenoid 19 is then energized, thus pressing the plate against the bottom rolls, and the current will traverse said plate between the rollers 3 and 4, thus primarily heating the same or if it comes directly from the skelp-mill raising its heat to a welding-heat. The bell will be in the open position indicated in Fig. 3 and the plate will be fed in any preferred way through the contact-rollers until its forward end has passed slightly beyond the bell. Then the solenoid 34 will be energized, thus causing the bell to be closed and bending the forward end of the tube into circular form, this bending being assisted by a short mandrel or ball 56, placed a short distance in front of the bell and which will prevent the plate from rising, so that its edges will be curved upward and toward each other. The rollers 40 will then be separated, and the tongs 48 will be inserted therethrough and attached to the forward end of the blank and then connected to the draw-chain, whereby the blank will be drawn forward at a rate of speed as great as the heating capacity of the current will permit, being thereby progressively bent into tubular form and its edges welded together. As soon as a sufficient length of tubing has been drawn to extend through the rollers 40 the upper rollers are lowered, and thereafter the tubing will be drawn through the welding mechanism by these rollers and will be simultaneously sized thereby.

The rate of drawing must not be so great that the current will not have time to raise the edges of the blank to a good welding heat; but by means of the continuously-operating drawing-rollers 40 a blank of indefinite length may be drawn through the welding mechanism.

What I claim is—

1. In electric tube-welding apparatus, the combination with current-conducting devices adapted to bear on the blank, of a welding-die, and endless mechanism for drawing the heated blank through said die.

2. In electric tube-welding apparatus, the combination with two pairs of plain-faced current-conducting rollers adapted to bear on a flat plate, of a bending and welding die, and endless mechanism for drawing the heated blank through said die.

3. In tube-welding apparatus, the combination with means for progressively heating the blank, of a welding-die, and positively-driven grooved rolls arranged to grip the tube and draw the same through the welding-die.

4. In electric tube-welding apparatus, the combination with current-conducting devices adapted to bear on the tube-blank, of a welding-die, and positively-driven sizing-rolls adjacent to the die and adapted to draw the tubing through said die.

5. In apparatus for forming welded tubing, the combination with means for progressively heating the blank, of a welding-die, reciprocating drawing mechanism adapted to be connected to said blank for preliminarily drawing the same, and positively-driven grooved rolls in proximity to the die adapted after the tube has been drawn a certain distance to grasp the same and thereafter draw the same through the die.

6. In apparatus for forming welded tubing, the combination with means for progressively heating the blank, of a welding-die, a pair of positively-driven grooved rolls in proximity thereto, means for separating said rolls, and reciprocating drawing mechanism arranged to be projected between the grooved rolls and grasp the blank and draw the same through the die.

7. In apparatus for forming welded tubing, the combination with means for heating the blank, of a die comprising two separable sections, means for moving both of said sections transversely of the width of the blank whereby said blank is bent into tubular form, and mechanism for drawing the blank through said die.

8. In tube-welding apparatus, the combination with means for heating the blank, of a two-part die or bell, a holder therefor comprising two pivoted members, means for moving both of said members transversely of the width of the blank, and mechanism for drawing the blank through said die.

9. In apparatus for forming welded tubing, the combination with means for heating the blank, of a two-part welding die or bell, a holder therefor comprising two pivoted jaws, a link connected to each of said jaws, a reciprocating block to which said links are connected, and means for reciprocating said block.

10. Tube-welding mechanism comprising a two-part die or bell, a holder therefor comprising two jaws pivoted together, toggle-links connected to said jaws for opening and closing the same, a solenoid for actuating said toggle-links, and an eccentric surrounding the pivot of one of said links for adjusting the same.

11. In apparatus for forming welded tubing, the combination with two pair of plain-faced current-conducting rollers adapted to contact with the plate, of a separable welding die or bell, mechanism for opening and closing the same, a pair of grooved rolls in proximity thereto, and a reciprocating drawing device adapted to be projected through said rolls and grasp the blank and draw the same through said rolls.

12. In apparatus for forming welded tubing, the combination with means for progressively heating the blank, of a welding-die adjacent to said heating means, grooved rolls adjacent to said die, mechanism for separating said rolls comprising toggle-links and actuating means therefor, and reciprocating drawing mechanism adapted to be inserted between said rolls to grasp the forward end of the blank and draw the same through said rolls.

13. In apparatus for forming welded tubing, the combination with two pairs of current-conducting devices, a welding-bell in proximity thereto, a pair of grooved rolls in proximity to the bell, a draw-bench having a draw-chain in advance of said grooved rolls, and mechanism for driving said grooved rolls and said draw-chain.

14. In apparatus for forming welded tubing, the combination with means for progressively heating the blank, of a welding-die adjacent to said heating means, positively-driven grooved rolls adjacent to said die, and drawing mechanism adapted to be inserted between said rolls to grasp the forward end of the blank and draw the same through said rolls.

15. In apparatus for forming welded tubing, the combination with means for progressively heating the blank, of a welding-die adjacent to said heating means, grooved rolls adjacent to said die, mechanism for separating said rolls, and drawing mechanism adapted to be inserted between said rolls to grasp the forward end of the blank and draw the same through said rolls.

16. In apparatus for forming welded tubing, the combination with means for progressively heating the blank, of a separable welding-die adjacent to said heating means, positively-driven grooved rolls adjacent to said die, mechanism for separating said rolls, means for closing said separable die, and drawing mechanism adapted to be inserted between said rolls to grasp the forward end of the blank and draw the same through said rolls.

17. In tube-welding apparatus, the combination with two pairs of current-conducting rollers adapted to bear on the blank, of movable bearings for one roller of each of said pairs, an electromagnet for moving said bearings, and bending and welding devices adjacent to said current-conducting rollers.

In testimony whereof I, the said GEORGE BAEHR, have hereunto set my hand.

GEORGE BAEHR.

Witnesses:
 A. M. STEEN,
 G. C. RAYMOND.